United States Patent [19]
Suzuki et al.

[11] Patent Number: 5,092,418
[45] Date of Patent: Mar. 3, 1992

[54] POWER STEERING SYSTEM

[75] Inventors: Katsuhiro Suzuki; Satoshi Arakawa, both of Gifu, Japan

[73] Assignee: Kayaba Industry Co. Ltd., Japan

[21] Appl. No.: 566,063

[22] Filed: Aug. 13, 1990

[30] Foreign Application Priority Data

Jun. 26, 1990 [JP] Japan .................................. 2-167545

[51] Int. Cl.⁵ .............................................. B62D 5/08
[52] U.S. Cl. .................................. 180/132; 91/375 A; 91/449; 137/625.23; 180/141; 180/142; 180/149
[58] Field of Search ............... 180/141, 142, 143, 149, 180/132; 91/375 A, 375 B, 449; 137/625.21, 625.22, 625.23

[56] References Cited

U.S. PATENT DOCUMENTS

| 4,771,841 | 9/1988 | Uchida et al. | 180/142 |
| 4,862,985 | 9/1989 | Uchida et al. | 180/141 |
| 4,899,842 | 2/1990 | Emori et al. | 180/142 |
| 4,958,695 | 9/1990 | Uchida et al. | 180/142 |

FOREIGN PATENT DOCUMENTS 2610274  8/1988  France .................... 180/149

*Primary Examiner*—Mitchell J. Hill
*Attorney, Agent, or Firm*—Steinberg & Raskin

[57] ABSTRACT

A valve body of a variable throttle valve is connected directly to a gear box of a power steering system so that an outlet port of the variable throttle valve communicates with a return port of the gear box. Such construction permits arrangement of the variable throttle valve with respect to the gear box to be carried out without using any piping, coupling and the like.

1 Claim, 5 Drawing Sheets

POWER STEERING SYSTEM

BACKGROUND OF THE INVENTION

This invention relates to a power steering system, and more particularly to a power steering system including a rotary valve structure.

A conventional power steering system is generally constructed in such a manner as shown in FIGS. 1 to 3. More specifically, the conventional power steering system includes a gear box 1, an input shaft 2 inserted into the gear box 1, a pinion shaft 3 and a torsion bar 4 for connecting the input shaft 2 and pinion shaft 3 to each other. The input shaft 2 is integrally formed with a rotary spool 5, on which a sleeve 6 is fitted so as to be rotatable relative to each other. The so-arranged rotary spool 5 and sleeve 6 constitute a rotary valve structure. The sleeve 6 is adapted to be rotated integral with the pinion shaft 3, and the pinion shaft 3 is formed with a pinion 7, which is engaged with a rack 8.

The input shaft 2 is operatively associated with a steering wheel (not shown), resulting in being rotated with rotation of the steering wheel in any one of clockwise and counterclockwise directions. Irrespective of such rotation of the input shaft 2, the pinion shaft 3 is kept non-rotated because grounding resistance acts on the side of the pinion shaft 3. Thus, the input shaft 2 and pinion shaft 3 are caused to rotate relative to each other while twisting the torsion bar 4. The relative rotation between both input shaft 2 and pinion shaft 3 causes the rotary spool 5 and sleeve 6 to be rotated relative to each other, so that the rotary valve structure may be changed over.

FIG. 2 shows an equivalent circuit for the rotary valve structure and FIG. 3 is a cross-sectional view of the equivalent circuit which is taken in a direction perpendicular to the axial direction of the power steering system. As shown in FIGS. 2 and 3, the rotary valve structure comprises a first valve group $V_1$ and a second valve group $V_2$ each arranged so as to control fluid guided from a pump P to a power cylinder PC and a third valve group $V_3$ and a fourth valve group $V_4$ each arranged so as to control fluid guided from the pump P to a reservoir tank T. At the boundary between the first and second valve groups $V_1$ and $V_2$ and the third and fourth valve groups $V_3$ and $V_4$ are provided block means 63 as shown in FIG. 3, to thereby prevent communication between the respective valve groups.

Now, supposing that the rotary valve structure is changed over in one direction, valves $a_1$ and $d_1$ of the first valve group $V_1$ and valves $a_2$ and $d_2$ of the second valve group $V_2$ are open, and valves $b_1$ and $c_1$ of the first valve group $V_1$ and valves $b_2$ and $c_2$ of the second valve group $V_2$ are closed. This causes pressure fluid to be supplied to one of pressure chambers of the power cylinder PC designated at reference numeral 9 and fluid in the other pressure chamber 10 to be returned to the reservoir tank T.

Also, in the third valve group $V_3$, a valve $e_3$ and a valve $h_3$ each are set to have a small degree of opening and a valve $g_3$ and a valve $f_3$ each are set to have a large degree of opening; whereas in the valve group $V_4$, a valve $e_4$ and a valve $h_4$ each are set to have a small degree of opening and a valve $g_4$ and a valve $f_4$ each are set to have a large degree of opening. This causes fluid flowing into the third and fourth valve groups $V_3$ and $V_4$ to be returned to the reservoir tank T.

When the steering wheel is rotated in a direction opposite to the above-described direction, the valves $b_1$ and $c_1$ of the first valve group $V_1$ and the valves $b_2$ and $c_2$ of the second valve group $V_2$ are open and the valves $a_1$ and $d_1$ of the first valve group $V_1$ and the valves $a_2$ and $d_2$ of the second valve group $V_2$ are closed. This causes pressure fluid to be fed to the other pressure chamber 10 of the power cylinder PC and fluid in the one pressure chamber 9 to be returned to the reservoir tank T.

Also, in the third valve group $V_3$, the degree of opening of each of the valve $f_3$ and $g_3$ is reduced and that of each of the valve $e_3$ and $h_3$ is increased. In the fourth valve group $V_4$, the degree of opening of each of the valves $f_4$ and $g_4$ are decreased and that of each of the valves $e_4$ and $h_4$ is increased. This results in working fluid flowing into the third and fourth valve groups $V_3$ and $V_4$ being returned to the reservoir tank T.

On the return side of the third and fourth valve groups $V_3$ and $V_4$ is arranged a passage 11, which is merged in the form of an external piping into an external piping passage 12 on the return side of the first and second valve group $V_1$ and $V_2$ and provided with a variable throttle valve 13a. The variable throttle valve 13a is electrically connected to a controller C. The controller C is adapted to generate a signal depending upon traveling conditions such as the speed of a vehicle or the like to control the degree of opening of the variable throttle valve 13a. More particularly, the controller C functions to increase the opening of the variable throttle valve 13a as the speed is increased and reduces it as the speed is decreased.

An increase in degree of opening of the variable throttle valve 13a causes a ratio of the amount or flow rate of fluid returned to the reservoir tank T to the amount or flow rate of fluid discharged from the pump P to be increased, so that the amount or flow rate of fluid fed to the power cylinder PC is reduced relatively or correspondingly, leading to a decreased in power assisting force.

On the contrary, a decrease in opening of the variable throttle valve 13a causes the amount or flow rate of fluid returned to the reservoir tank T to be reduced correspondingly, so that the amount or flow rate of fluid supplied to the power cylinder PC is increased, resulting in power assisting force being increased correspondingly.

As described above, the conventional power steering system is so constructed that power assisting force for the power cylinder PC is controlled depending upon the speed of a vehicle and in any case, the amount of oil returned to the reservoir tank T is adjusted depending upon the opening of the variable throttle valve 13a and the supply pressure to the power cylinder PC is finally controlled through restriction of the first to fourth valve groups $V_1$ to $V_4$. Such construction of the conventional system causes pressure acting on the third and fourth valve groups positioned on the upstream side of the variable throttle valve 13a to be substantially equal to that acting on the first and second valve groups and to be distributed and act on the rotary spool 5 in a circumferentially equal manner, resulting in preventing the rotary valve structure from being deformed.

Unfortunately, in the conventional power steering system constructed as described above, the variable throttle valve 13a connected to the gear box 1 is arranged away from the gear box 1 as shown in FIG. 1, so that it is required to arrange a piping, a coupling, and the like between the variable throttle valve 13a and the gear box 1 in order to connect the variable throttle valve 13a to the gear box 1, resulting in the power steering system being complicated in structure. Also, this causes the power steering system to be highly large-sized because a space for piping and the like is required.

Further, the arrangement of the piping, coupling and the like requires to form a connection between the piping and the coupling with threads, leading to an increase in the number of working steps and therefore an increase in manufacturing cost.

SUMMARY OF THE INVENTION

The present invention has been made in view of the foregoing disadvantages of the prior art.

Accordingly, it is an object of the present invention to provide a power steering system which is capable of being significantly simplified in structure.

It is another object of the present invention to provide a power steering system which is capable of highly reducing a space required for installing the system.

It is a further object of the present invention to provide a power steering system which is capable of being assembled without using any piping and coupling.

It is still another object of the present invention to provide a power steering system which is capable of effectively preventing an increase in manufacturing cost.

In accordance with the present invention, a power steering system is provided which includes a gear box, an input shaft inserted into the gear box, a rotary valve structure arranged in the gear box and associated through the input shaft with a steering wheel, and a power cylinder. The rotary valve structure includes a rotary spool and a sleeve arranged around the rotary spool, wherein the rotary spool and sleeve cooperates together to constitute first to fourth valve groups. The first to fourth valve groups are changed over depending upon rotation of the steering wheel. The first and second valve groups are adapted to control the flow rate of fluid fed to the power cylinder and the third and fourth valve groups are adapted to control the flow rate of fluid returned.

The power steering system of the present invention generally constructed as described above is featured in that it includes a variable throttle valve arranged on the downstream side of the third and fourth valve groups and including a valve body formed with an inlet port and an outlet port, wherein the valve body of the variable throttle valve is connected directly to the gear box in such a manner that the inlet port communicates with a return port for the third and fourth valve groups and the outlet port communicate with a return port for the first and second valve groups.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein:

FIGS. 1 to 3 show a conventional power steering system, in which FIG. 1 is a sectional view of the conventional power steering system which is taken along the axis thereof, FIG. 2 is a circuit diagram showing an equivalent circuit of the conventional power steering system and FIG. 3 is a sectional view of the conventional power steering system which is taken in a direction perpendicular to the axis thereof; and FIGS. 4 to 6 show an embodiment of a power steering system according to the present invention, in which FIG. 4 is a vertical sectional view of the power steering system clearly showing a rotary valve structure and a rack and pinion combination, FIG. 5 is a partially sectional view showing a variable throttle valve and FIG. 6 is a circuit diagram showing a connection between a rotary valve structure and a power cylinder.

DETAILED DESCRIPTION OF THE PREFERRED EMBODIMENT

Now, a power steering system according to the present invention will be described hereinafter with reference to FIGS. 4 to 6.

Figure 1:
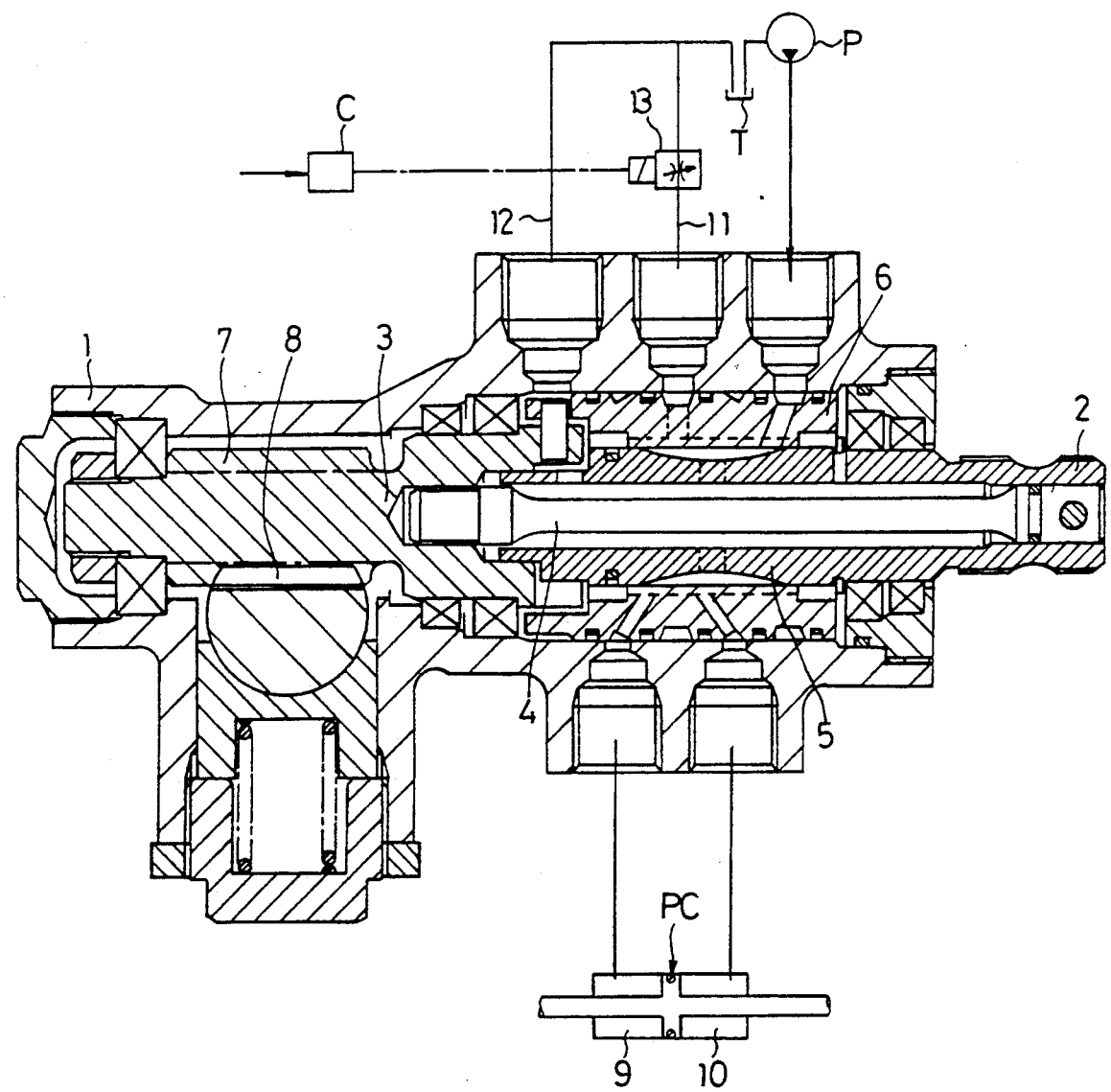
Figure 2:
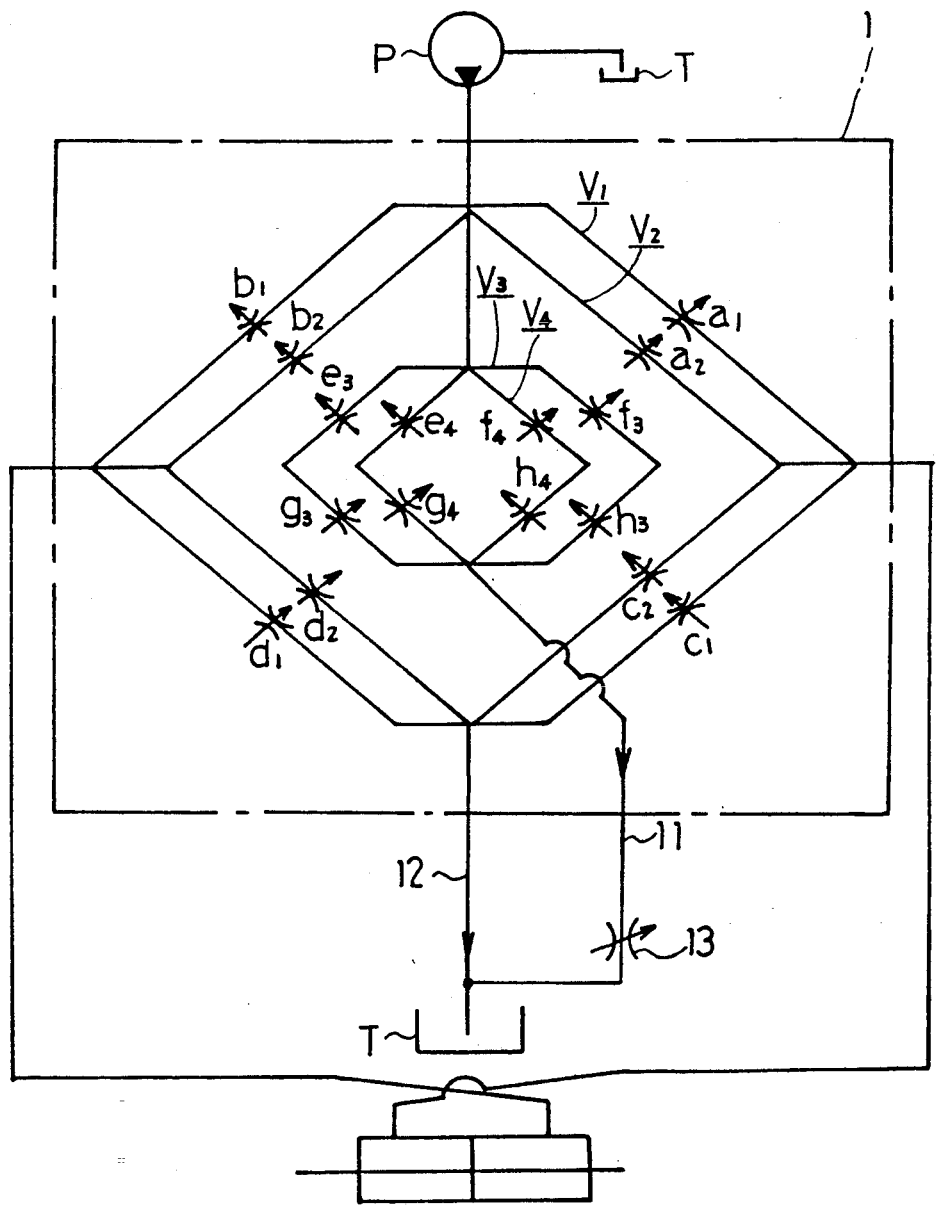
Figure 3:
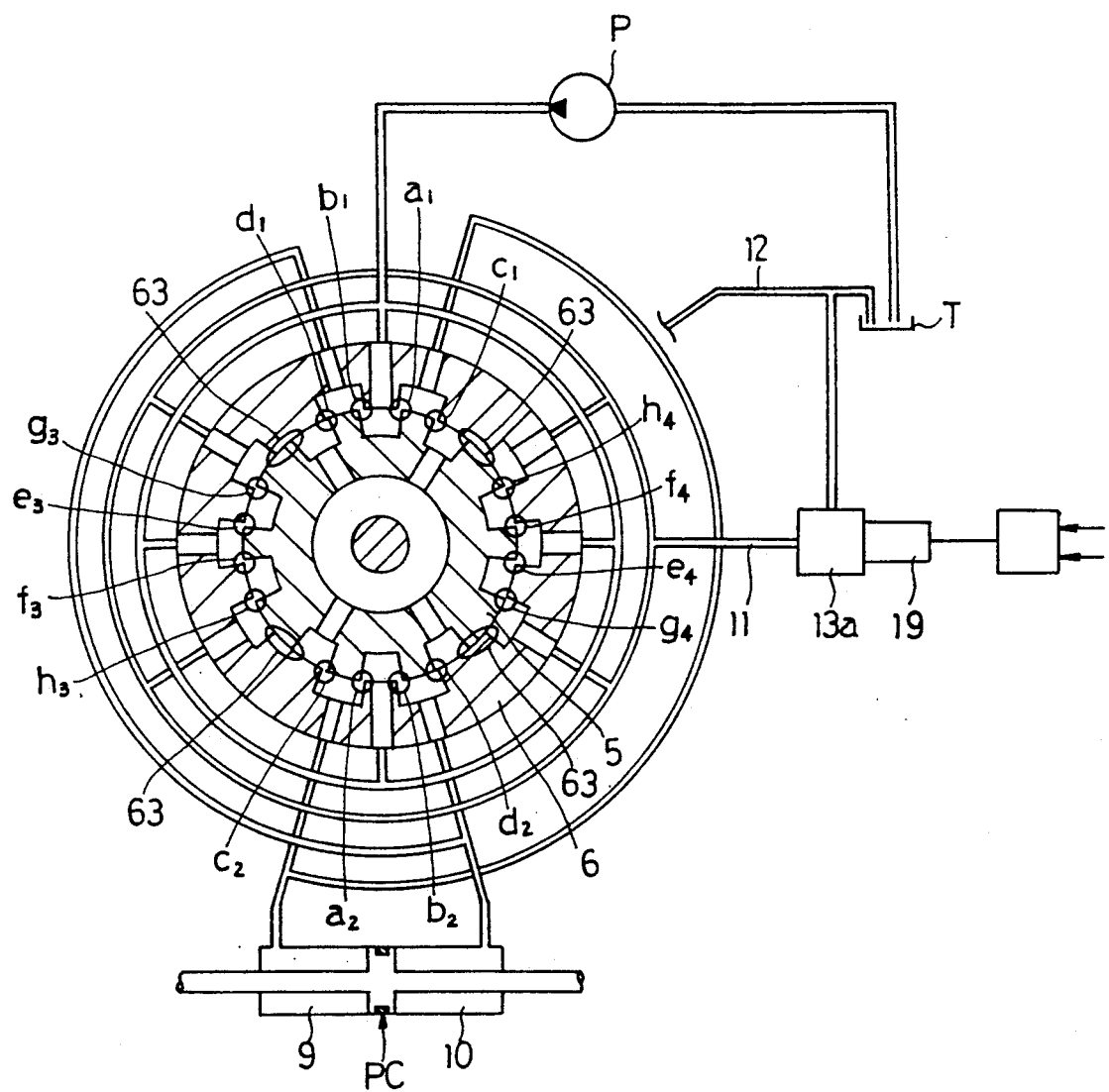
Figure 4:
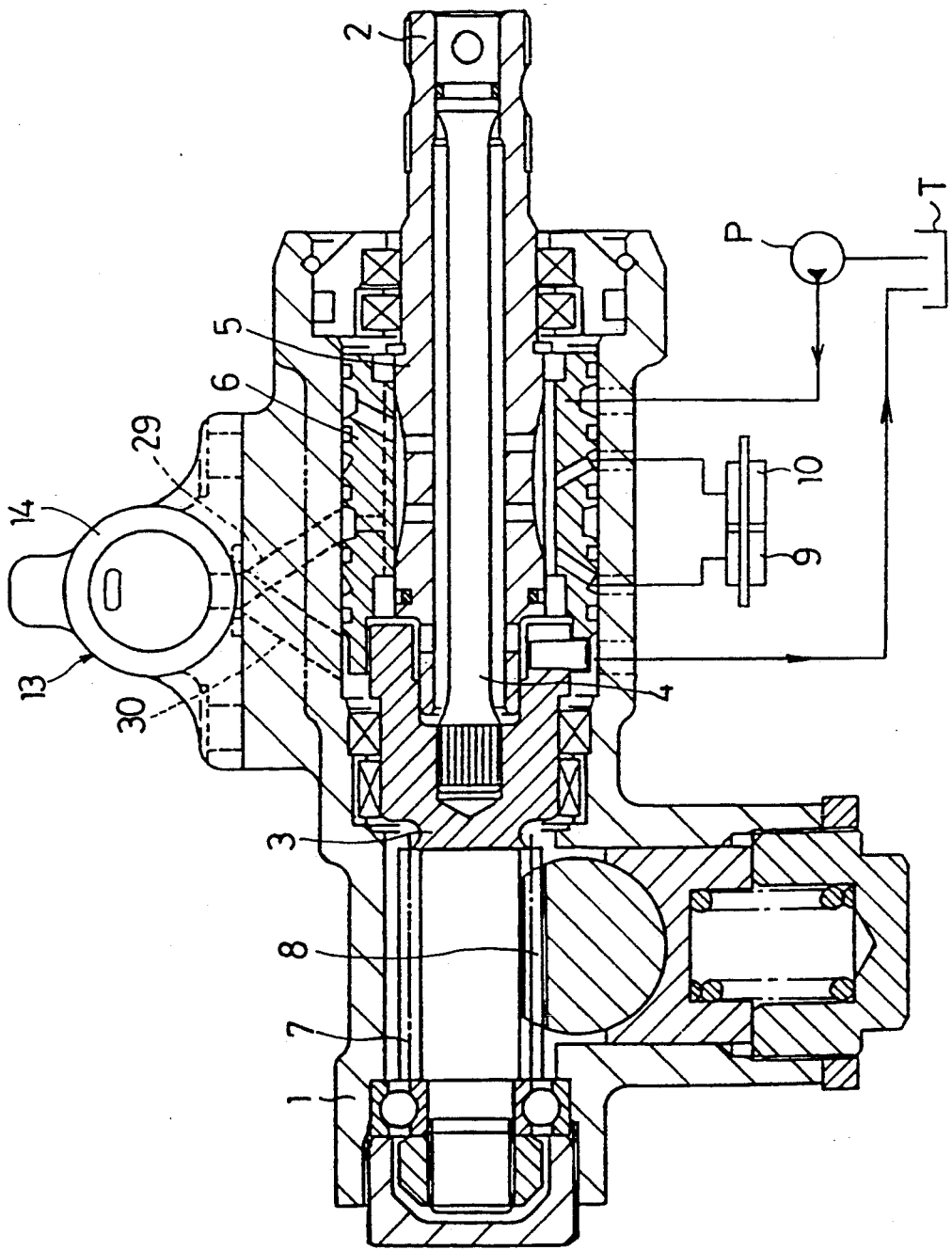
Figure 5:
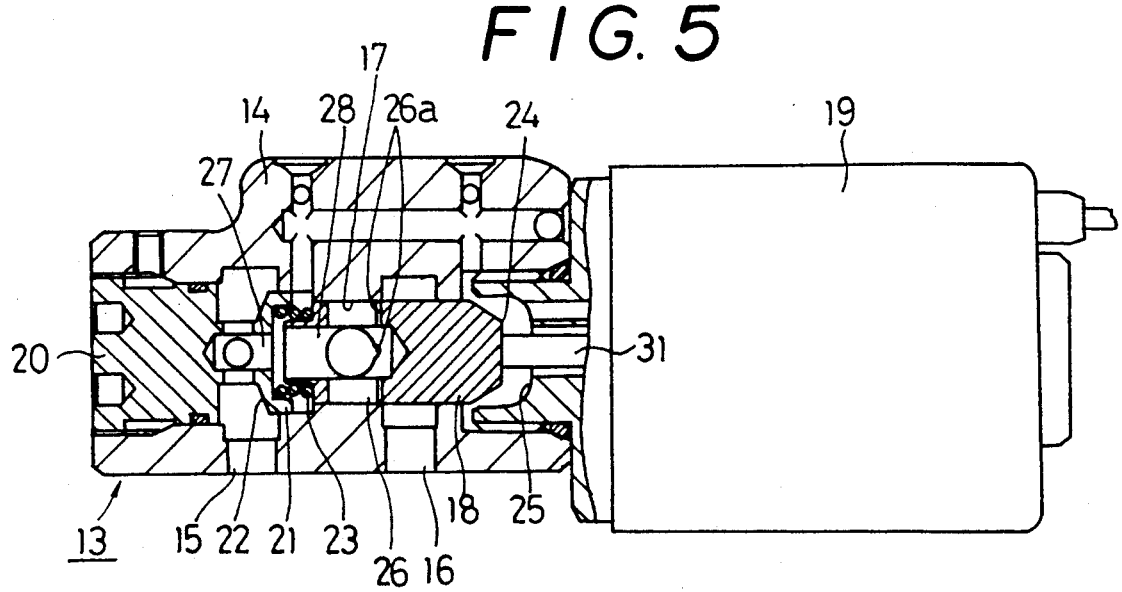
Figure 6:
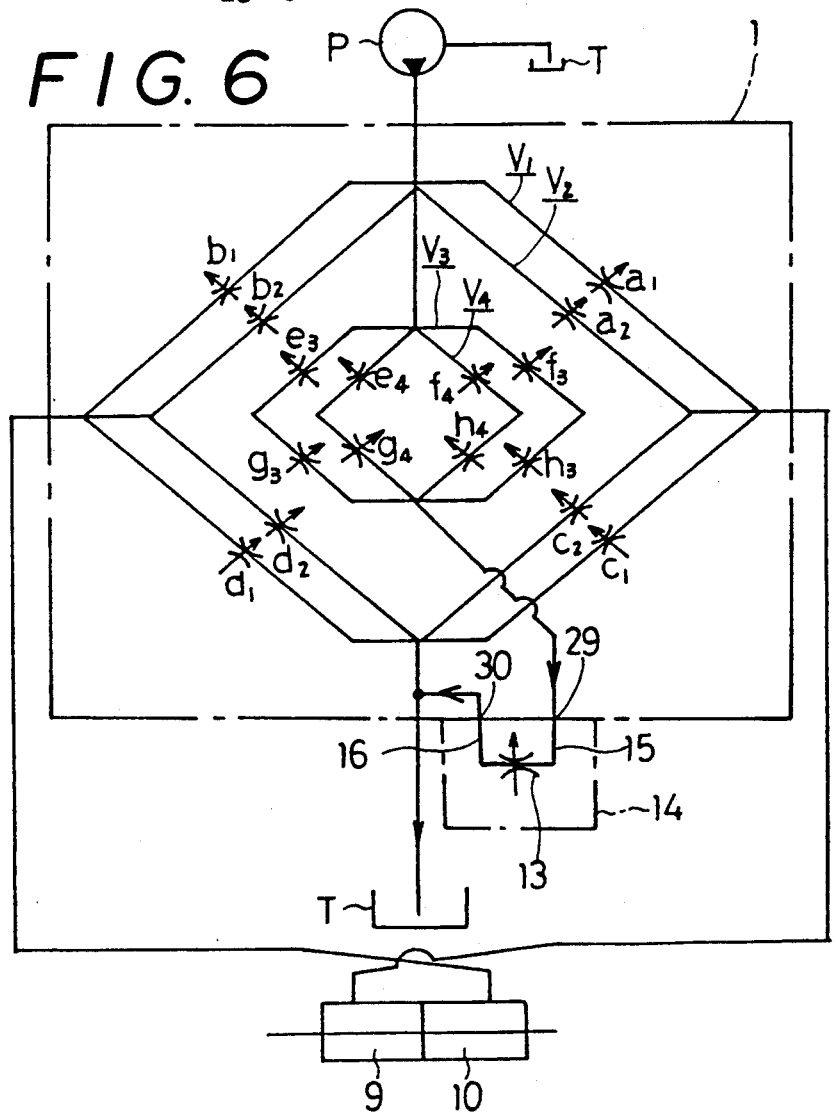

FIGS. 4 to 6 show an embodiment of a power steering system according to the present invention. One of features of a power steering system of the illustrated embodiment is that a variable throttle valve 13 is arranged in such a manner that a valve body 14 of the variable throttle valve 13 is connected directly to a gear case 1 and, in association with such arrangement of the variable throttle valve 13, a passage structure is constructed in a manner different from the prior art. The remaining part of the illustrated embodiment may be constructed in substantially the same manner as the conventional power steering system described above.

The valve body 14 of the variable throttle valve 13, as shown in FIG. 5, is formed with an inlet port 15 and an outlet port 16 and at the central portion thereof with a valve hole 17. In the valve hole 17 is arranged a valve element 18 so as to be slidable therein. Also, the valve hole 17 is provided at one end thereof with a solenoid 19 and at the other end thereof with a plug 20 in a manner to be fitted therein. The plug 20 is formed at the inner end thereof with a spring bearing 21. Also, the plug 20 is formed with an annular groove 23 in a manner to be positioned adjacent to the outside of the spring bearing 21.

Between the spring bearing 21 and the valve element 18 is interposedly arranged a spring 23, so that when the solenoid 19 is kept non-excited, the valve element 18 is kept at a normal position by resilient force of the spring 23. In the illustrated embodiment, the normal position is defined by regulating the position of a push rod 31 arranged in the valve body 14 by means of a stopper (not shown) arranged in the solenoid 19.

The valve element 18 constructed as described above is formed with a plurality of control holes 26 in a manner to extend in a diametric direction thereof. The control holes 26 each are formed at the portion thereof positioned on the side of the distal end of the valve element 18 with a notch 26a. Also, the valve element 18 is formed with a communication passage 28 extending in the axial direction thereof which is adapted to cause the control holes 26 to communicate with a flow passage 27 formed at the plug 20. The flow passage 27 of the plug 20 is arranged so as to communicate through the annular groove 22 with the inlet port 15.

The valve body 14 constructed as described above, as shown in FIGS. 4 and 6, is connected directly to the gear box 1 in such a manner that the above-described inlet port 15 communicates with a return port 29 provided at the system for third and fourth valve groups $V_3$ and $V_4$ and the above-described outlet port 16 communicates with a return port 30 provided at the system for first and second valve group $V_1$ and $V_2$.

Now, the manner of operation of the power steering system of the illustrated embodiment constructed as described above will be described hereinafter. In the illustrated embodiment, the degree of opening of the first to fourth valve groups $V_1$ to $V_4$ obtained when a rotary valve structure is changed over is determined in substantially the same manner as the prior art described above and the operation of a power cylinder PC is carried out as described above in connection with the prior art. Thus, the description will be made mainly in connection with the variable throttle valve 13.

When the solenoid 19 is kept non-excited, the spring 23 causes the valve element 18 to be moved to the normal position at which the push rod is positionally regulated. At this state, the control holes 26 are open to a maximum degree with respect to the outlet port 16, resulting in the degree of opening of the variable throttle valve 13 being maximum. This causes most of fluid flowing through the third and fourth valve groups $V_3$ and $V_4$ to be returned from the inlet port 15 through the flow passage 27, communication passage 28, control holes 26 and outlet port 16 to a reservoir tank T.

Thus, most of fluid flowing through the third and fourth valve groups $V_3$ and $V_4$ is returned to the reservoir tank T, so that the amount of fluid fed to the power cylinder PC is decreased correspondingly, resulting in power assisting force for the power cylinder PC being reduced correspondingly.

Then, when the solenoid 19 is excited by means of an excitation current, the push rod 31 pushes the valve element 18 depending upon the excitation current, resulting in the valve element 18 being moved to, for example, a position shown in FIG. 5. In such a state, the outlet port 16 and the notch 26a of each of the control holes 26 do not substantially overlap with each other as shown in FIG. 5, to thereby prevent flowing of fluid from the inlet port 15 to the outlet port 16.

When the excitation current of the solenoid 19 is controlled in the non-overlapping state shown in FIG. 5, the degree of opening of a restriction section constituted by the outlet port 16 and the control hole 26 including the notch 26a is controlled. The control of the solenoid 19 is carried out through a controller C as in the prior art, thus, the degree of opening is increased when the speed of a vehicle is high and reduced when it is low.

As can be seen from the foregoing, the power steering system of the illustrated embodiment is so constructed that the valve body 14 of the variable throttle valve 13 is connected directly to the gear box 1. Such construction permits the variable throttle valve 13 and gear box 1 to communicate with each other without any piping, coupling and the like.

While a preferred embodiment of the invention has been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. A power steering system comprising:
   a gear box;
   an input shaft inserted into said gear box;
   a rotary valve structure arranged in said gear box and associated through said input shaft with a steering wheel;
   a power cylinder;
   said rotary valve structure including a rotary spool and a sleeve arranged around said rotary spool;
   said rotary valve structure further comprising first and second valve groups arranged so as to control the flow rate of fluid fed to said power cylinder and third and fourth valve groups arranged so as to control the flow rate of fluid returned from said power cylinder;
   said first, second, third and fourth valve groups each comprising a plurality of valves which are alternatively opened or closed depending upon rotation of the steering wheel; and
   a variable throttle valve arranged on the downstream side of said third and fourth valve groups such that said input shaft and said variable throttle valve are perpendicular to each other;
   said variable throttle valve including a valve body having an inlet port and an outlet port;
   said valve body of said variable throttle valve being connected directly to said gear box such that said inlet port communicates with a return port for said third and fourth valve groups and said outlet port communicates with a return port for said first and second valve groups.

* * * * *